Sept. 9, 1969  D. L. FERRIS ET AL  3,465,831
HELICOPTER ROTOR STACK BEARING
Filed March 19, 1968  2 Sheets-Sheet 1
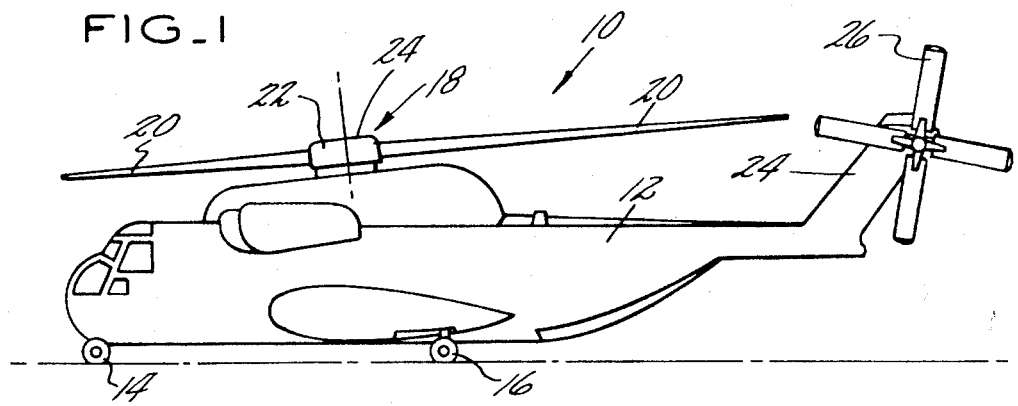
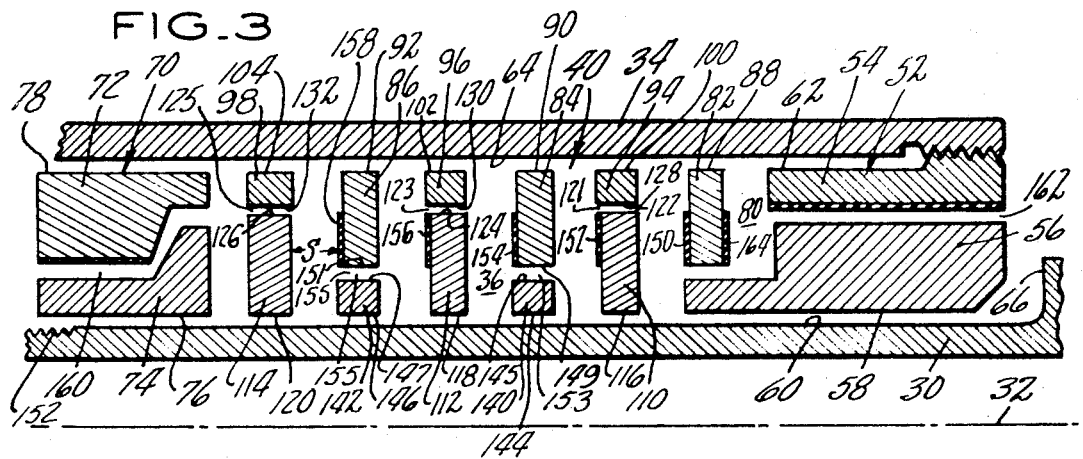
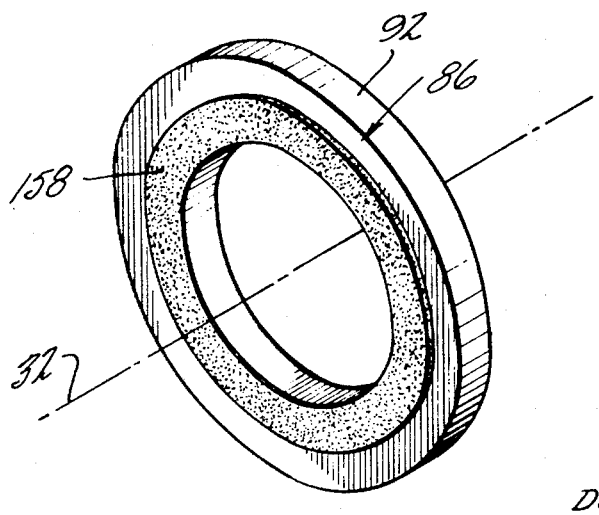
INVENTORS
DONALD L. FERRIS
BERNARD ZISMAN
BY Vernon F. Hauschild
ATTORNEY

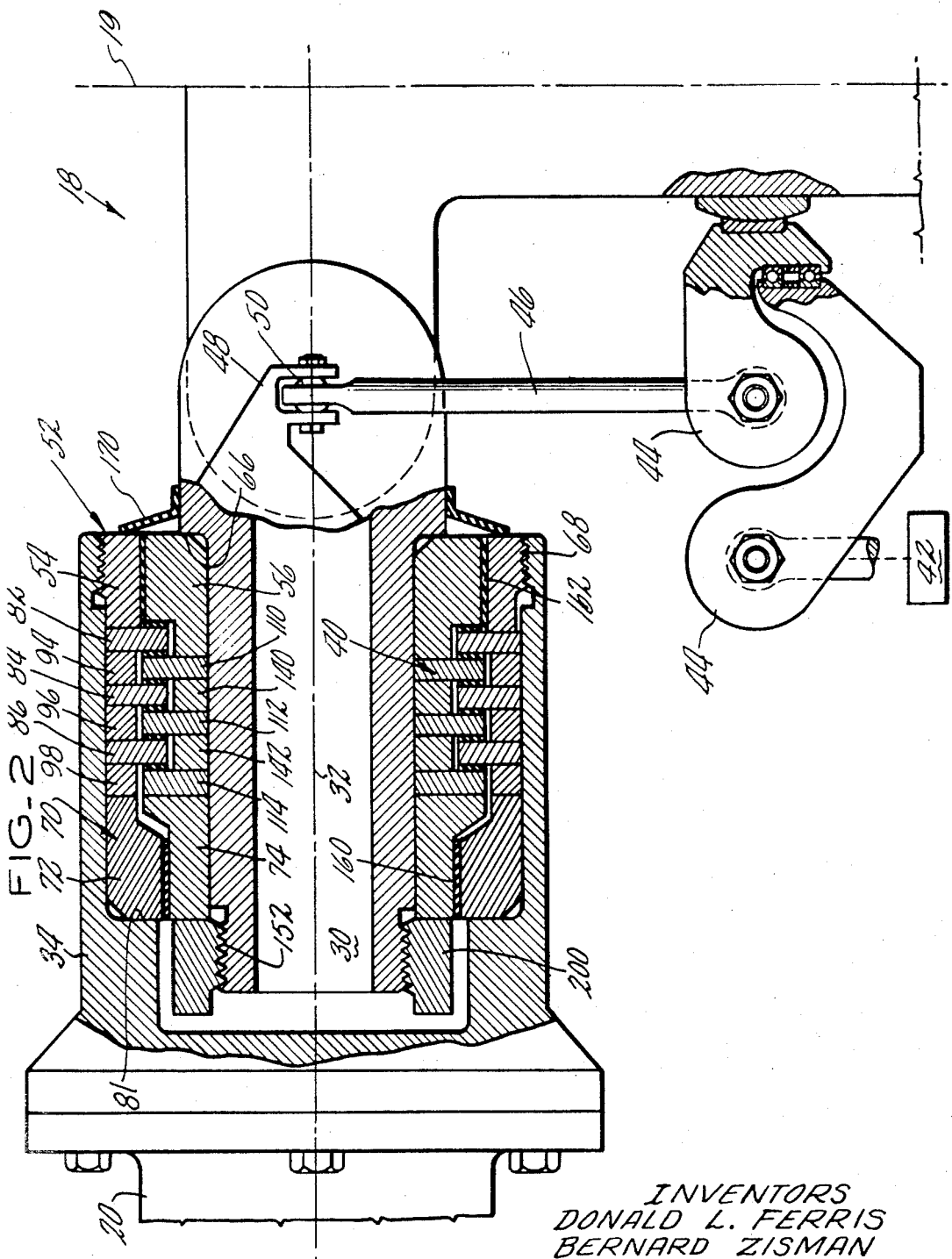

United States Patent Office 3,465,831
Patented Sept. 9, 1969

3,465,831
HELICOPTER ROTOR STACK BEARING
Donald L. Ferris, Newtown, and Bernard Zisman, Stratford, Conn., assignors to United Aircraft Corporation, East Hartford, Conn., a corporation of Delaware
Filed Mar. 19, 1968, Ser. No. 714,271
Int. Cl. B64c 27/48
U.S. Cl. 170—160.58     10 Claims

ABSTRACT OF THE DISCLOSURE

A stack bearing supporting a helicopter blade and sleeve from the helicopter rotor spindle and absorbing centrifugal loads therebetween including a first plurality of spaced washers mounted for pitch-change rotation with blade and sleeve and a second plurality of spaced washers interleaved between the washers of the first plurality and having a sheet of solid lubricant positioned between and engaging the bearing surfaces of adjacent washers to provide friction-free relative rotation therebetween.

BACKGROUND OF THE INVENTION

This invention relates to helicopter rotors and more particularly to the stack bearing used between the rotor spindle and the blade sleeve so as to support the sleeve from the spindle for rotation about the pitch-change axis and to transfer centrifugal and radial loads therebetween.

In the past, anti-friction bearings, such as ball bearings or roller bearings have been used as the stack bearing in helicopter rotors. Such a prior art type of stack bearing is shown in U.S. Patents Nos. 3,119,454 and 2,549,886. This construction is not altogether satisfactory because it is heavy and the anti-friction bearings require lubrication. This need for lubrication presents the problem of supplying an oil-type of lubrication to the bearings, from a reservoir area and elaborate sealing to confine the oil-type lubricant in the desired area.

SUMMARY OF INVENTION

A primary object of the present invention is to provide a maintenance free, inexpensive, easily assembled and disassembled stack bearing between the spindle and blade sleeve of a helicopter rotor, which stack bearing is self-lubricating.

In accordance with the present invention, a plurality of selectively spaced ring washer members are mounted to rotate with the blade sleeve about the pitch-change axis and a second plurality of selectively spaced ring washers are mounted on the rotor spindle and interleaved into the spaces between the first plurality and cooperating therewith to define a centrifugal load or thrust carrying mechanical chain between the rotor spindle and the blade sleeve and including a layer of solid lubricant positioned between the mating surfaces of adjacent washers of the first and second plurality, which layer of solid lubricant is preferably bonded to one of the ring washers.

In accordance with a further aspect of the present invention, a stack bearing of minimal radial dimension with respect to the blade pitch-change axis is provided between the rotor spindle and the blade sleeve of a helicopter.

In accordance with still a further aspect of the present invention, the solid lubricant coated washers are selectively spaced and separated by spacers interleaved between the ring washers, and of a thickness equal to the ring washer plus the layer of solid lubricant so that the spacing between each adjacent set of washers is the same and therefore the load carried by each washer set is equalized throughout the stack bearing.

In accordance with another aspect of the present invention, the stack washers are positioned between support rings and spindle spacers which are mounted to and extend between the rotor spindle and the blade sleeve to support the sleeve from the spindle and include a layer or sheet of solid lubricant between the spindle spacers and support rings thereof to permit friction free pitch-change rotation and to absorb the radial loads of the blade sleeve with respect to the rotor spindle about the blade pitch-change axis.

It is still a further aspect of this invention that if one of the sheets of solid lubricant is either too thick or too thin with respect to the remaining sheets, wear of the lubricant sheets in normal operation will soon cause all sheets to be of equal thickness and therefore bring the stack washers into equal load sharing condition.

BRIEF DESCRIPTION OF THE DRAWING

FIG. 1 is a showing of a modern helicopter using a rotor head of the type which would employ our invention.

FIG. 2 is a showing of the connection between the rotor spindle and the blade sleeve of a helicopter to illustrate the stack bearing which is the subject matter of our invention.

FIG. 3 is an exploded cross sectional view of the elements of our stack bearing.

FIG. 4 is a perspective showing of one of the stack rings with a ring of solid lubricant bonded thereto.

DESCRIPTION OF THE PREFERRED EMBODIMENT

FIG. 1 is a side view of a modern helicopter 10 which comprises fuselage 12 supported from the ground by landing gear 14 and 16. Rotor head 18 is supported from the fuselage 12 for rotation about axis of rotation 19 and includes a plurality of helicopter blades 20 projecting substantially radially therefrom with respect to axis 19. Preferably, fairing 22 covers rotor head 18, which may be of the articulated type shown in U.S. Patent No. 3,119,454, or of the rigid type shown in U.S. Patent No. 3,106,964. Anti-torque rotor 26 is carried from empennage 24 to react the torque which the rotation of rotor 18 imposes on fuselage 12.

Now viewing FIGS. 2, 3 and 4, we see our invention in greater particularity. It should be borne in mind that while one sleeve and spindle stack bearing only is illustrated to show the connection between the rotorhead and one of the helicopter blades, there is a similar stack bearing connection between the rotorhead and the other blades 20. Each blade 20 is connected to rotorhead 18 by spindle 30, which is attached to and projects substantially radially from rotorhead 18 with respect to axis of rotation 19. Spindle 30 is of substantially circular cross section and concentric about pitch-change or feathering axis 32, and is preferably cylindrical in shape. Blade sleeve 34, which may be an integral part of blade 20 or attached thereto in any convenient manner, is also of circular cross section, concentric about pitch-change axis 32 and preferably cylindrical and envelops spindle 30 so as to form annular chamber 36 therebetween. Stack bearing 40 is positioned in annular chamber 36 and serves to support blade sleeve 34 from rotor spindle 30 so as to permit blade pitch-change rotation about pitch-change axis 32 as sleeve 34 is caused to rotate about spindle 30. This pitch-change rotation is caused in conventional fashion by a control system 42 which selectively positions swashplate 44, which acts through link rod 46, which is pivotally connected to pitch-change horn 48 through pivot joint 50 so that motion of the swash plate 44 will cause blade sleeve 34 and hence blade 20 to rotate about pitch-change axis 32, thereby varying blade pitch and controlling the lift potential of rotor 18. Control system 42, swash plate 44 and pitch horn 48 may be of the type fully disclosed in U.S. Patent No. 3,199,601.

Stack bearing 40 includes retainer ring 52 which is made up of support or spacer ring 54 and inboard spindle spacer 56 which are concentric about axis 32 and extend between spindle 30 and sleeve 34 in that the inner diameter 58 of spacer 56 engages the outer diameter 60 of spindle 30 and the outer diameter 62 of ring 54 engages the inner diameter 64 of sleeve 34. Spacer 56 abuts shoulder 66 of spindle 30 and ring 52 is connected to sleeve 34 by any convenient means such as screw threaded means 68. It will be noted that retainer ring 52 is located at the inboard end of annular chamber 36, that is, the end of the chamber closest to axis of rotation 19. Stack bearing 40 also includes outboard retainer ring 70 which includes concentric outer and inner spacer rings 72 and 74, which extend between spindle 30 and sleeve 34 in that the inner diameter 76 of ring 74 engages the outer diameter 60 of spindle 30 and the outer diameter 78 of ring 76 engages the inner diameter 64 of sleeve 34. Ring 72 abuts shoulder 81 of sleeve 34. Retainer rings 52 and 70 cooperate to support sleeve 34 from spindle 30 and for rotation about axis 32 with respect thereto and to serve transfer radial loads therebetween and also serve to retain spaced ring washer assemblies now to be described therebetween. Retainer rings 52 and 70 are spaced along axis 32 and cooperate with spindle 30 and sleeve 34 to define annular chamber 80 therebetween. Chamber 80, which is actually the central part of chamber 36, is filled with a first plurality of stacked ring washers or disc members 82, 84 and 86, whose outer diameters 88, 90 and 92 engage the inner diameter 64 of sleeve 34. Selectively ground ring spacers 94, 96 and 98, whose outer diameters 100, 102 and 104 also engage inner diameter 64 of sleeve 34, serve to space washers 82, 84 and 86 longitudinally along axis 32 and cooperate therewith and with spaced rings 54 and 72 to define a first thrust or load carrying chain 72–98–86–96–84–94–82–54 which is mounted for rotation with sleeve 34 about axis 32. Ring washers or disc members 110, 112 and 114 have inner diameters 116, 118 and 120 which engage the outer diameter 60 of spindle 30 and have outer diameters 122, 124 and 126 which are somewhat smaller than the inner diameters 128, 130 and 132 of spacers 94, 96 and 98, respectively, to form gaps 121, 123 and 125 therebetween. Spacers 94, 96 and 98 are in radial alignment with ring washers 110, 112 and 114, respectively, with respect to pitch-change axis 32. Selectively ground ring spacers 140 and 142 have inner diameters 144 and 146 which engage the outer diameter 60 of spindle 30 and are positioned between washers 110–114 to space those washers longitudinally along axis 32 such that the washers 82–86 of sleeve 34 are interleaved with or positioned between the washers 110–114 of spindle 30. The outer diameters 145 and 147 are less than the inner diameters 149 and 151 of washers 84 and 86 so that gaps 153 and 155 are formed therebetween since spacers 140 and 142 are in radial alignment with washers 84 and 86, respectively, with respect to pitch-change axis 32. Rings 110–114, ground spacers 140 and 142, and rings 74 and 56 are retained by nut 200, which threadably engages spindle 30 at thread connection 152, against shoulder 66 of spindle 30 to form a load or thrust carrying chain 200–74–114–142–112–140–110–56 which remains stationary with spindle 30 with respect to axis 32 and which cooperates with the aforementioned load-carrying chain 72–52 to transfer centrifugal loads or thrust between sleeve 34 and spindle 30 as rotor 18 rotates about axis 19. It will accordingly be seen that stack bearing 40 supports sleeve 34 from spindle 30 for pitch-change rotation about axis 32 and transmits radial load with respect to axis 32 therebetween through support and retainer rings 52 and 70, and transfers centrifugal loading therebetween by means of the cooperation and coaction between the aforementioned rotary and stationary chains 72–54 and 200–56.

It should be noted that spacer rings 94–98 and 140 and 142, as well as ring washers 82–86 and 110–114 are of rectangular cross section and are positioned coaxially about pitch-change axis 32, and are preferably made of stainless steel such as QQ-S-763-321.

It is an important teaching of this invention that a layer of solid lubricant such as Teflon, manufactured by E. I. du Pont de Nemours & Company, Inc., or Rulon, manufactured by the Dixon Corp. of Bristol, R.I. or Du, manufactured by Garlock, Inc. of Camden, N.J. be positioned between the overlapping bearing surfaces of the adjacent stack ring washers 82–110–84–112–86–114 and it is important that the spacers 94–98 and 140–142 be of selected dimension along axis 32 so that the space S (FIG. 3) between adjacent stacked washers along axis 32 is the same and is equal to the thickness of the solid lubricant layers or sheets 150–152–154–156–158, which are bonded to ring washers 82, 110, 84, 112 and 86, respectively, and which, as best shown in FIG. 2, extend between and contact the overlapping bearing surfaces of adjacent washers. It should be borne in mind that the solid lubricant sheet could be bonded to either or both of two adjacent washers. While the solid lubricant is illustrated herein as a solid sheet, it could as well be a periphery confined layer of powder. Should the lubrication layer be the aforementioned Teflon, a thickness of about .010 to .012 inch is preferable; if Rulon, a thickness of about .020 inch is preferred.

A similar layer of solid lubricant 160 is positioned between rings 72 and 74 of retainer ring 70 and such a layer of solid lubricant 162 is positioned between rings 54 and 56 of retainer ring 52 to absorb the radial loading between the sleeve 34 and the spindle 30. In addition, a similar layer of solid lubricant 164 is positioned between spacer ring 56 and the inboard side of washer 82. The longitudinal dimension of retainer rings 52 and 70 along axis 32 are selected to cooperate with the previously described ground spacers and stacked washers to define a gap between washer 82 and spacer ring 86 which is the same as the dimension of the thickness of the solid lubricant sheet 164 positioned therebetween.

It is important to note that the spacer rings 56 and 74 and ground ring spacers 140 and 142 are selectively sized to contact only the spindle ring washers 110–114. Similarly, spacer rings 54 and 72, and ground ring spacers 94–98 are selectively sized to contact only sleeve ring washers 82–86.

It is an important teaching of our invention that if any of the solid lubricant sheets or layers, such as 158, between adjacent stacked washers, such as 114 and 86, is undersized in thickness, the overloading of the other washer members will cause the solid lubricant layers therebetween to wear away somewhat until all solid lubricant layers 150–164 are of equal thickness and then all washers will carry equal loads. Similarly, if one of the solid lubricant layers, such as 158, is oversized in thickness it will wear away under its overload condition until all solid lubricant layers 150–158 are of equal thickness so as to bring about an equal load carrying distribution among the various washers.

With this construction, it will be seen that during normal rotor operation when spindle 30 supports sleeve 34 and blade 20 against the centrifugal force as rotor 18 rotates, the centrifugal load or thrust carrying chain will be from blade 20, then sequentially through sleeve 34, support ring 52, washer 82, washer 110, washer 84, washer 112, washer 86, washer 114, spindle spacer 74, nut 200 and then to spindle 30 of rotor head 18. If there should be a reverse centrifugal load condition, the centrifugal load transfer will be from blade 20 through sleeve 34 and thence sequentially through the outer spacer 72, spacer 98, washer 86, washer 112, washer 84, washer 110, washer 82, inboard spindle spacer 56, and then through shoulder 66 to spindle 30 of rotor head 18.

As best shown in FIG. 4, preferably the solid lubricant sheets, such as 158, are ring shaped and bonded to one or the other of the adjacent, juxtapositioned load bearing washers, such as 114 and 86.

As best shown in FIG. 2, a wiper ring or seal 170 is bonded to spindle 30 and bears against sleeve 34 or support ring 52 to keep foreign material out of stack bearing 40.

What is claimed is:

1. In a helicopter rotor mounted for rotation about an axis of rotation,
    (1) a spindle member attached to the helicopter rotor for rotation therewith and projecting radially therefrom and being of substantially circular cross section and concentric about a pitch-change axis,
    (2) a sleeve member adapted to be connected to a helicopter blade and being of substantially circular cross section and coaxial about the pitch-change axis with and enveloping said spindle member to form an annular chamber therebetween,
    (3) bearing means located in said annular chamber and connected to said spindle member and said sleeve member so as to position said sleeve member from said spindle member and to transfer centrifugal loading therebetween as the helicopter rotor rotates and including:
        (a) a plurality of disc members positioned coaxially along said pitch-change axis so that each disc member presents a bearing surface to the adjacent disc member,
        (b) a layer of solid lubricant positioned between the bearing surfaces of adjacent disc members to provide lubrication therebetween and to permit friction-free relative motion therebetween.

2. In a helicopter rotor adapted to be rotated about an axis of rotation,
    (1) a cylindrical spindle member connected to said rotor for rotation therewith and extending radially therefrom and determining a pitch-change axis,
    (2) a cylindrical sleeve member adapted to be connected to a helicopter blade and being coaxial with and enveloping said spindle member to define an annular chamber therebetween,
    (3) a stack bearing located in said annular chamber and extending between the outer diameter of said spindle member and the inner diameter of said sleeve member to support said sleeve member for rotation with respect to said spindle member about said pitch-change axis and to transfer centrifugal loads therebetween and including:
        (a) a first retainer ring positioned at one end of said annular chamber and extending between the outer diameter of said spindle member and the inner diameter of said sleeve member,
        (b) a second retainer ring positioned in said annular chamber and spaced longitudinally along said pitch-change axis from said first spacer ring and extending between the outer diameter of said spindle member and the inner diameter of said sleeve member, and cooperating with said first retainer ring to position said sleeve from sleeve from said spindle for rotation thereabout and to transfer radial loads therebetween,
        (c) a first plurality of annular washer members sleeved onto the inner diameter of said sleeve member for rotation therewith,
        (d) first spacer means to selectively space the washers of said first plurality along said pitch-change axis,
        (e) a second plurality of annular washers sleeved over the outer diameter of said spindle member so as to be fixed with respect thereto,
        (f) second spacer means to selectively space the washers of said second plurality longitudinally along said pitch-change axis so that a washer of said second plurality is positioned between adjacent washers of said first plurality to thereby produce overlapping bearing surfaces between the washers of said first and second pluralities,
        (g) a sheet of solid lubricant positioned between and contacting adjacent bearing surfaces of the washers of said first and second plurality to permit friction free relative rotation therebetween.

3. Apparatus according to claim 2 wherein said first and second retainer rings each includes two coaxial spacer rings positioned in spaced radial relation with respect to said pitch-change axis with respect to said spindle.
    (1) a spindle projecting radially from the rotor with contacting the mating surfaces of said coaxial spacer rings to permit friction free relative rotation therebetween.

4. Apparatus according to claim 3 wherein said spacer means for said first and second pluralities of washers are ground spacer rings of selected dimension along said pitch-change axis so that the spacing along said pitch-change axis between adjacent overlapping bearing surfaces of the washers of said first and second plurality are equal and equal to the thickness along said pitch-change axis of said solid lubricant sheet positioned therebetween.

5. Apparatus according to claim 4 wherein the outer spacer of said first retainer ring is connected to said sleeve member and the outer spacer of said second retainer ring abuts said sleeve longitudinally and, further, wherein the outer spacers of said first and second retainer rings are of selected radial dimension with respect to said pitch-change axis so that said outer spacers form a longitudinal load-carrying mechanical chain with said washers of said first plurality and their ground spacer rings so that said outer spacers are of selected dimension to engage the washers of said second plurality and their ground spacer rings, and including meanse connected to said spindle member and adapted to apply a compressive load between said spindle member, said inner spacers of said first and second retainer rings, said washers of said second plurality and their ground spacer rings so that said inner spacers of said first and second retainer rings, said washers of said second plurality, and their ground spacer rings are fixed with said spindle with respect to said pitch-change axis.

6. Apparatus according to claim 2, and including sealing means extending between said spindle and said sleeve to seal off said annular chamber from atmosphere.

7. Apparatus according to claim 5 wherein said ground spacers of said first plurality of washers are in radial alignment with respect to said pitch-change axis with said washers of said second plurality and have inner diameters slightly larger than the outer diameters of the washers of said second plurality so as to be radially spaced therefrom and, further so that the ground spacers of the second plurality of washers are in radial alignment with respect to said pitch-change axis with the washers of said first plurality and have outer diameters slightly less than the inner diameters of said first plurality of washers so as to be spaced radially therefrom, and, still further so that the thickness of said ground spacers along said pitch-change axis causes the washers of said first and second plurality to be equally spaced longitudinally along said pitch-change axis.

8. Apparatus according to claim 7 and including means to selectively cause the blade and sleeve to rotate about said pitch-change axis with respect to said spindle.

9. In a helicopter rotor adapted for rotation about an axis of rotation:
    (1) a spindle projecting radially from the rotor with respect to said axis of rotation and being of circular cross section and defining a pitch-change axis,
    (2) a blade sleeve adapted to be connected to a helicopter blade and being of circular cross section and coaxial about the pitch-change axis with and enveloping said spindle to define an annular chamber therebetween, (3) a stack bearing positioned in said annular chamber and including:
- (a) a first plurality of ring washers selectively spaced along the pitch-change axis and concentric thereabout and mounted for rotation with said sleeve,
- (b) a second plurality of ring washers selectively spaced along said pitch-change axis and positioned to be interleaved between the washers of said first plurality with substantially equal spacing longitudinally along said pitch-change axis between adjacent washers of said first and second plurality,
- (c) a layer of solid lubricant positioned between and engaging adjacent washers of said first and second pluralities to permit friction free relative rotation therebetween about said pitch-change axis,
- (d) means cooperating with said washers to establish a centrifugal load carrying chain therethrough between said blade sleeve and said rotor spindle.

10. Apparatus according to claim 9 wherein said layer of solid lubricant is bonded to one of said washers.

References Cited

UNITED STATES PATENTS

| | | | |
|---|---|---|---|
| 3,200,887 | 8/1965 | Ballauer | 170—160.25 |
| 3,292,711 | 12/1966 | Peterson | 170—160.53 |
| 3,297,094 | 1/1967 | Kisovec | 170—160.53 X |

FOREIGN PATENTS

| | | |
|---|---|---|
| 934,336 | 1/1948 | France. |
| 935,352 | 2/1948 | France. |

EVERETTE A. POWELL, JR., Primary Examiner

U.S. Cl. X.R.

170—160.23

UNITED STATES PATENT OFFICE
CERTIFICATE OF CORRECTION

Patent No. 3,465,831          Dated September 9, 1969

Inventor(s) Donald L. Ferris and Bernard Zisman

It is certified that error appears in the above-identified patent and that said Letters Patent are hereby corrected as shown below:

| | |
|---|---|
| Column 5, line 63, | Cancel "from" |
| Column 5, line 64, | Cancel "sleeve" |
| Column 6, line 14, | Cancel "with respect to said spindle and insert --and having-- |
| Column 6, lines 15, 16, 17, and 18, | Cancel "(1) a spindle projecting radially from the rotor with contacting the mating surfaces of said coaxial spacer rings to permit friction free relative rotation therebetween." |
| | And insert --(1) a sheet of solid lubricant positioned between and contacting the mating surfaces of said coaxial spacer rings to permit friction free relative rotation therebetween.-- |
| Column 6, line 38, | Cancel "meanse" and insert --means-- |

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents